Sept. 1, 1936. W. J. GARDNER 2,053,073
PROJECTING CAMERA FOR USE IN TRACING DESIGNS
Filed May 20, 1935 2 Sheets-Sheet 2
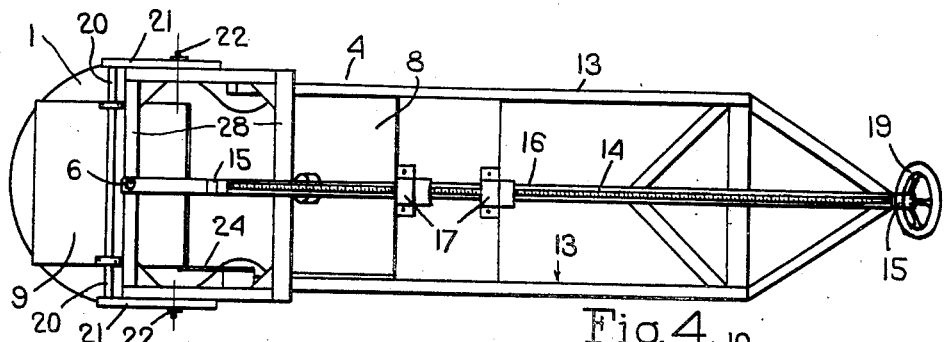
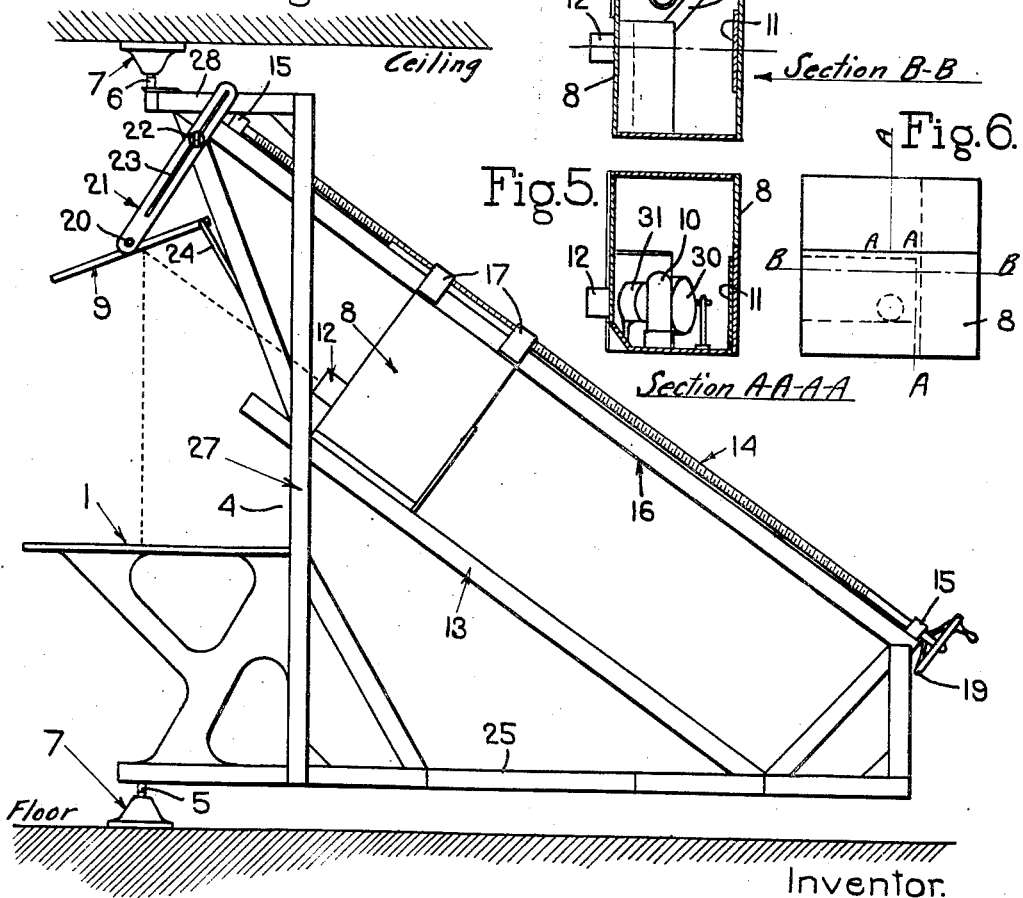
Inventor.
William J. Gardner
by Heard Smith & Tennant.
Attys.

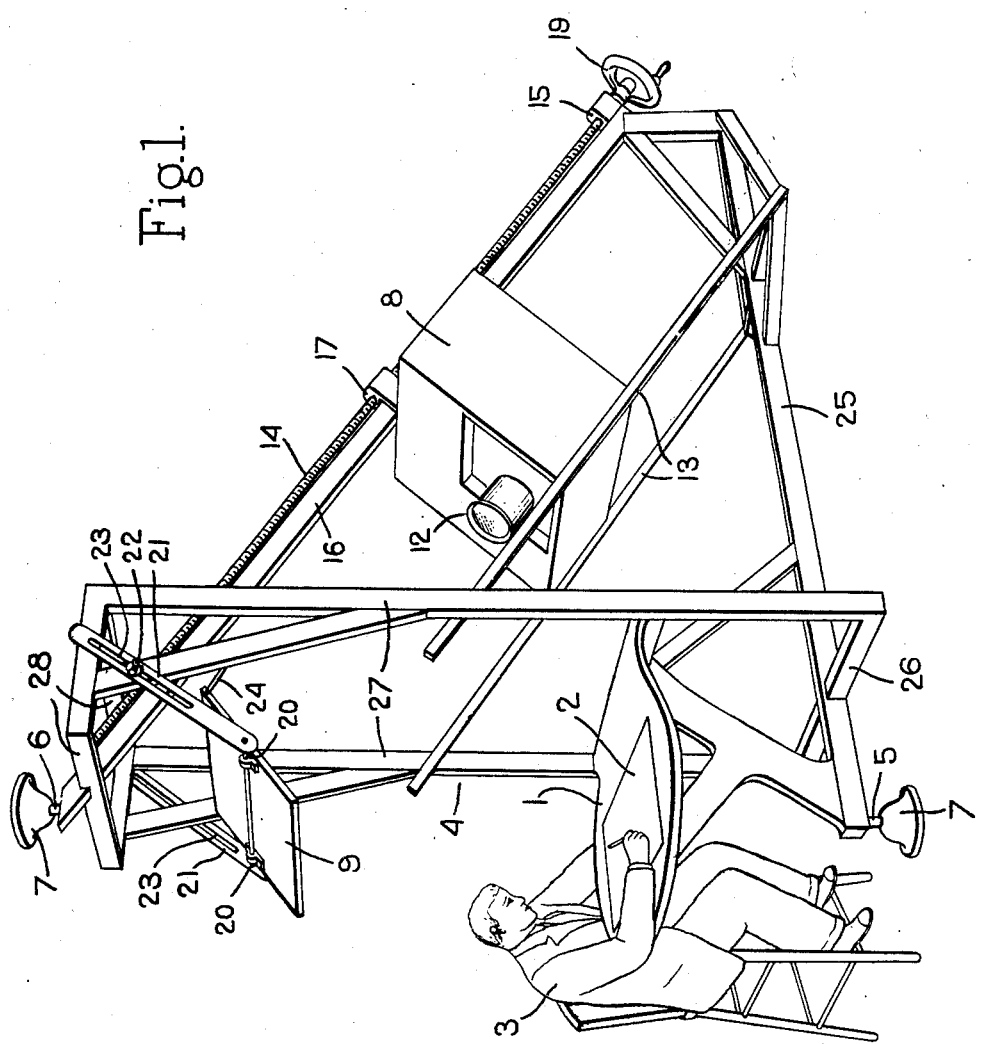

Patented Sept. 1, 1936

2,053,073

UNITED STATES PATENT OFFICE 2,053,073

PROJECTING CAMERA FOR USE IN TRACING DESIGNS

William J. Gardner, Fall River, Mass.

Application May 20, 1935, Serial No. 22,358

4 Claims. (Cl. 88—24)

This invention relates to a projecting camera which is especially designed for use in tracing designs, and while it is capable of general use where it is desired to trace an enlargement of a design on a sheet of paper or metal plate, yet the invention has been especially designed for use in tracing enlargements of a design on a masterplate from which are made the rolls used in print works for printing designs on cloth.

In the making of such master-plates it is the common practice to project an enlarged image of one repeat of the design on the plate which is provided with a suitable wax coating, and the engraver then traces the outline of the design on the wax-coated plate. This plate is subsequently etched and from it the rolls used in the cloth-printing machine are made.

Heretofore the master-plate on which the image of the design is projected has been supported on a fixed table and with this arrangement the engraver frequently finds it necessary to shift his position relative to the table and the plate in order to bring himself and his hand into the most convenient position to trace different parts of the design, this shift in position sometimes involving a change of location from one side of the table to the other.

The object of my present invention is to provide an improved projecting camera which is constructed so that the table supporting the master-plate can be freely turned into different positions about a vertical axis so as to obtain a relative position between the artist's hand and the plate which is most convenient for drawing different portions of the design without necessitating changing the position of the artist.

In carrying out my invention I provide a supporting frame on which is carried a table having a horizontal table top for supporting the masterplate, which frame is mounted for free turning movement about a vertical axis extending through the table top, and I also mount a projecting camera and the design to be traced on the frame so that the camera will project the image of the design onto a plate supported by the table top. The projecting camera with the design to be traced and the table have the same position relative to each other in all positions of the supporting frame so that the image of the design is always correctly projected onto the master-plate supported by the table regardless of the angular position of the frame. Since the camera and the table are both thus supported on the freely revolving frame it is possible to swing the frame with the table, camera and design to be traced into different positions to bring different portions of the projected design into a position relative to the artist's hand which is most convenient for the proper tracing of each portion of the design.

With this invention, therefore, the artist may remain sitting in one position and can readily turn the table and the master-plate supported thereby into the various positions in which different parts of the design can be most easily traced or drawn.

In order to give an understanding of the invention I have illustrated in the drawings a selected embodiment thereof which will now be described after which the novel features will be pointed out in the appended claims.

Fig. 1 is a perspective view of the projecting camera embodying my invention.

Fig. 2 is a top plan view thereof.

Fig. 3 is a side view.

Fig. 4 is a section on the line B—B Fig. 6.

Fig. 5 is a section on the line A—A—A—A Fig. 6.

Fig. 6 is a side view of the projecting camera.

In the drawings 2 indicates the plate or sheet, on which the artist 3 is to trace the design. Said plate or sheet is supported on the table top 1 of a suitable table device that is carried by a supporting frame 4 which is pivotally mounted to turn about a vertical axis extending through the table top. As herein shown the frame 4 is provided with the lower pivot pin 5 and the upper pivot pin 6, said pivot pins being mounted for rotation in suitable bearings 7. The table top 1 will preferably be circular in shape except at the side where it is attached to the frame 4. Mounted on the frame 4 is an enlarging projecting camera 8 constructed to project an image onto the table top 1, and in the construction herein shown the camera 8 is situated at one side of the table and is positioned to project the image onto a mirror or reflector 9 which reflects it on the table top 1.

The camera 8 may have any suitable or usual construction. As shown in Fig. 4 it is provided with means to hold the drawing or design 11 to be traced, an electric light or other source of illumination 10 designed to illuminate said drawing or design and lenses 12 to project an image of the design onto the mirror 9 which reflects it onto the table top 1.

The camera is preferably supported for bodily adjustment so as to provide for projecting onto the table top 1 an image which is enlarged to any desired extent. For this purpose the camera operates in guides or ways 13 and is adjusted toward and from the mirror 9 by means of an adjusting screw 14 which is mounted for rotation in bearings 15 carried by the inclined member 16 of the frame 4. This screw has screw-threaded engagement with a nut member 17 which is rigid with the camera 8. The adjusting screw 14 is provided with the hand-wheel 19 by which it may be turned and by rotating the screw the camera may be adjusted to change the over-all distance between the camera and the table thereby providing for projecting an image of the design which is enlarged to the desired extent.

The mirror 9 may be supported in any convenient way on the frame. As herein shown it is provided with two supporting arms 20 that are mounted in bracket members 21 carried by the frame and these bracket members are shown as being adjustably secured to the frame by means of the bolts 22 which extend through slots 23 formed in the brackets. 24 is a bracing member which connects the mirror to the frame and serves to hold the mirror at the proper angle.

The supporting frame may be constructed in various ways without departing from the invention. As herein shown it is formed with a horizontal base member 25, a lower cross member 26, the two uprights 27 which are connected at their upper ends by the head portion 28 and the inclined member 16 connecting the rear end of the base portion 25 to the head member 28.

In using the device the master-plate 2 is placed on the table top 1, the artist's drawing of the design to be reproduced on the master-plate is placed in the camera 8 and the latter is adjusted so as to project onto the plate an image of the design which is enlarged to the desired point. The artist or engraver then seats himself at the table as shown in the drawings and as he traces the outline of the projected image on the plate 2 he can swing the frame carrying the table and the camera into various angular positions about its vertical axis so as to bring different portions of the projected image into positions which are most convenient for him to trace without the necessity of changing the position of his body or moving his seat. This makes it possible for the engraver or tracer to work on the tracing from any angle desired without twisting his body or moving to different sides of the table.

I claim.

1. A projection device for projecting an image of a design to be traced, said projection device comprising a supporting frame mounted for turning movement about a vertical axis, a table carried by the frame and having a horizontal table top situated in the axial line of the frame, and means carried by the frame for supporting the design to be traced and for projecting onto the table top an image of said design, whereby a person sitting at the table can swing the frame into different angular positions to bring any portion of the projected image into a position most convenient to trace.

2. A device of the class described comprising a supporting frame mounted for turning movement about a vertical axis, a table carried by the frame and having a horizontal table top situated in the axial line of the frame, and a projecting camera also carried by the frame and including means to hold the design to be traced and to project onto the table top an image of said design.

3. A device of the class described comprising a supporting frame mounted for turning movement about a vertical axis, a table carried by the frame and having a horizontal table top situated in the axial line of the frame, a projecting camera also carried by the frame and constructed to hold the design to be traced and to project onto the table top an image of said design and means to adjust the projecting camera on the frame to vary the degree to which the image is enlarged.

4. A device of the the class described comprising a table having a table top for supporting a plate on which a design is to be traced, a projecting camera having means to hold said design and to project an image of said design onto the plate and means for supporting the table and the projecting camera for free turning movement as a unit about a vertical axis extending through the table top, whereby the image is undisturbed by the turning movement and a person sitting at the table can turn it and the projecting camera into a position to bring any portion of the projected image into a position most convenient to trace.

WILLIAM J. GARDNER.